June 4, 1957  J. S. GOLIGHTLY  2,794,300
GLASS BENDING LEHRS
Filed Jan. 31, 1956  6 Sheets-Sheet 1

INVENTOR.
JAMES S. GOLIGHTLY
BY
Oscar L. Spencer
ATTORNEY

June 4, 1957  J. S. GOLIGHTLY  2,794,300
GLASS BENDING LEHRS

Filed Jan. 31, 1956  6 Sheets-Sheet 2

INVENTOR.
JAMES S. GOLIGHTLY
BY
Oscar H. Spencer
ATTORNEY

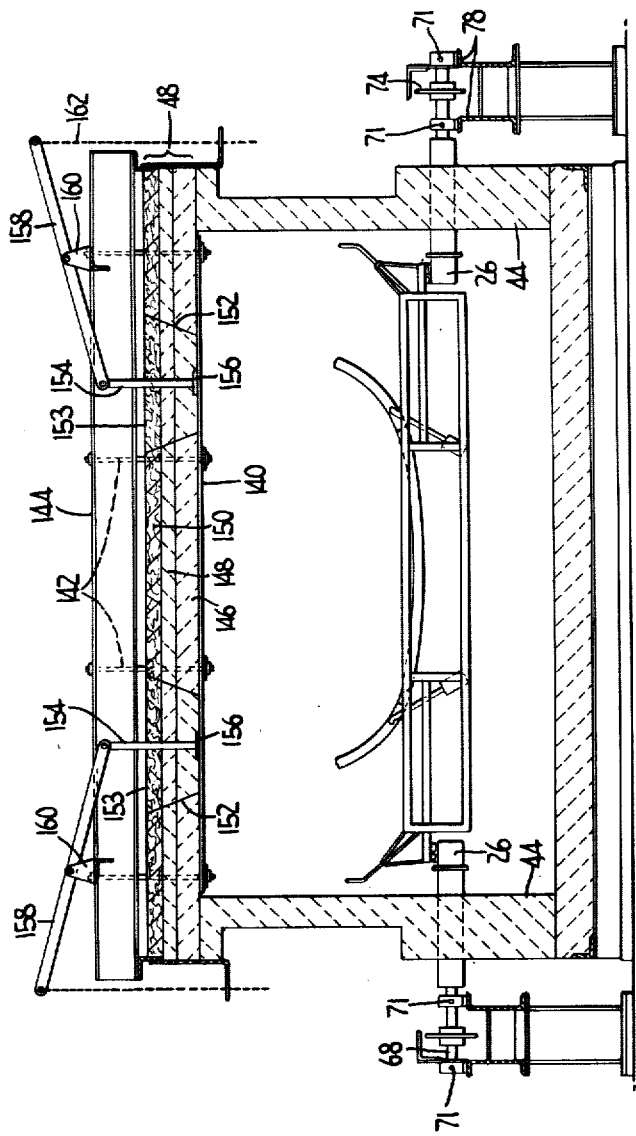

INVENTOR.
JAMES S. GOLIGHTLY
BY
Oscar H Spencer
ATTORNEY

June 4, 1957 J. S. GOLIGHTLY 2,794,300
GLASS BENDING LEHRS

Filed Jan. 31, 1956 6 Sheets-Sheet 5

INVENTOR.
JAMES S. GOLIGHTLY
BY
Oscar L. Spencer
ATTORNEY

United States Patent Office 2,794,300
Patented June 4, 1957

2,794,300
GLASS BENDING LEHRS

James S. Golightly, Fox Chapel, Pa., assignor to Pittsburgh Plate Glass Company, Allegheny County, Pa., a corporation of Pennsylvania Application January 31, 1956, Serial No. 562,383

10 Claims. (Cl. 49—47)

The present invention relates broadly to glass bending lehrs. More particularly, it relates to improvements in glass bending lehrs to bend flat glass sheets into shapes of a complex nature having regions of relatively gentle curvature and other regions of relatively severe curvature.

Glass sheets are conventionally bent by mounting them while flat on suitable molds and introducing the glass laden molts into a tunnel-like lehr having zones of progressively increasing heat. When the glass reaches a zone where the temperatures are sufficiently high, the sheets soften and settle onto the surface of the supporting mold. When the mold surfaces include relatively sharply curved areas, it has been found advantageous to create local zones of concentrated heat in the general furnace heating zones to cause more rapid softening of those portions of the glass sheet there are to settle into registry with the sharply curved regions of the mold.

A particularly complex structure for producing these complex bends is shown in Patent No. 2,671,987 issued to Joseph E. Jendrisak. The patented apparatus utilizes gas burners for the general overall furnace heat and auxiliary gas burners whose location is adjustable within narrow limits for localized heating. However, the apparatus disclosed in the Jendrisak patent is very cumbersome to handle and requires considerable manipulation in order to insure that the auxiliary burners are moved to their proper positions for different bends. This limitation is inherent when gas fired tubes mounted through the furnace walls comprise the auxiliary heating elements. Complicated manipulations involving pivoting and both horizontal and oblique movements are needed to vary the vertical separation of the auxiliary heating tubes from the glass sheets. Also, the intensity of the auxiliary heat provided by the gas fired tubes cannot be controlled with the regulation desired for glass bending.

A primary object of the present invention is to provide bending lehrs wherein glass sheets can be bent into non-uniform curvatures by utilizing glass heating elements whose position relative to the glass can be adjusted more easily and whose intensity of radiation applied to portions of the glass can be controlled far more precisely than prior art apparatus.

Another object of the present invention is to provide improvement in apparatus for bending glass sheets into non-uniform curvatures which comprise the addition of auxiliary heating elements and slotted roof portions for the bending section of a bending lehr and support means for the auxiliary heating elements including an apertured base plate covering the slotted portion to permit moving the electrical heating elements horizontally transversely of the path of movement of the glass sheets through the lehr and moving the auxiliary heating elements vertically independently of any transverse horizontal movement.

A particular object of the present invention is the improvement in apparatus for bending glass sheets into complex bends having a central area of relatively gentle plex bends flanked by regions of relatively sharp curvature which utilizes electrical heating elements in the bending section of the lehr having means for controlling their vertical and horizontal positions independently of each other to provide spaced zones of intense radiation aligned with the regions of the glass sheets to be bent most severely as the latter are conveyed through the bending sections.

These and other objects of the present invention will become clear upon studying the description of a particular embodiment of the present invention which follows.

In the drawings which form part of the description, like reference numerals are provided throughout to designate the same elements. In the drawings:

Figure 4 is a cross sectional view taken along the lines IV—IV of Figure 1.

Figure 1:
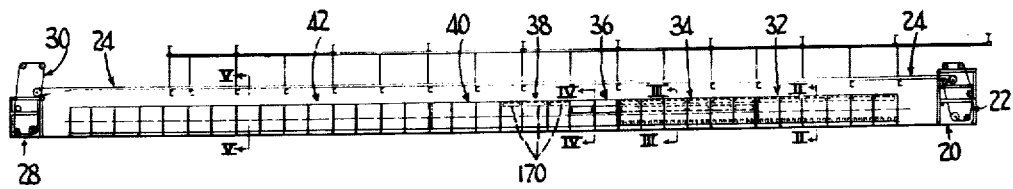
Figure 1 is a longitudinal elevation of a particular bending lehr built in accordance with the principles of the present invention.

A typical bending lehr according to the present invention is shown in the drawings. In these drawings, the apparatus comprises a loading station 20 including an elevator conveyor 22 used to lower mold support carriages from a mold return conveyor 24 to the loading station. A stub roll conveyor 26 (omitted from Figure 1 for the sake of clarity) extends through the entire length of the lehr. At the end of the lehr is a discharge station 28 where the glass laden molds are removed. A lifting conveyor 30 transfers the molds after the bent glass is unloaded therefrom onto the mold return conveyor 24. The details of the elevator 22, mold return conveyor 24 and lift 30 do not form any part of the present invention.

The conveyor 26 extends consecutively through a preheat section 32, a bending section 34, a neutralizing zone 36, an annealing and reheating section 38, a second annealing section 40 and a cooling section 42.

The present invention resides in the particular construction of the bending lehr, and the sequence of its sections, as well as in the particular structural elements included in the bending section.

Preheating section

Figure 2:
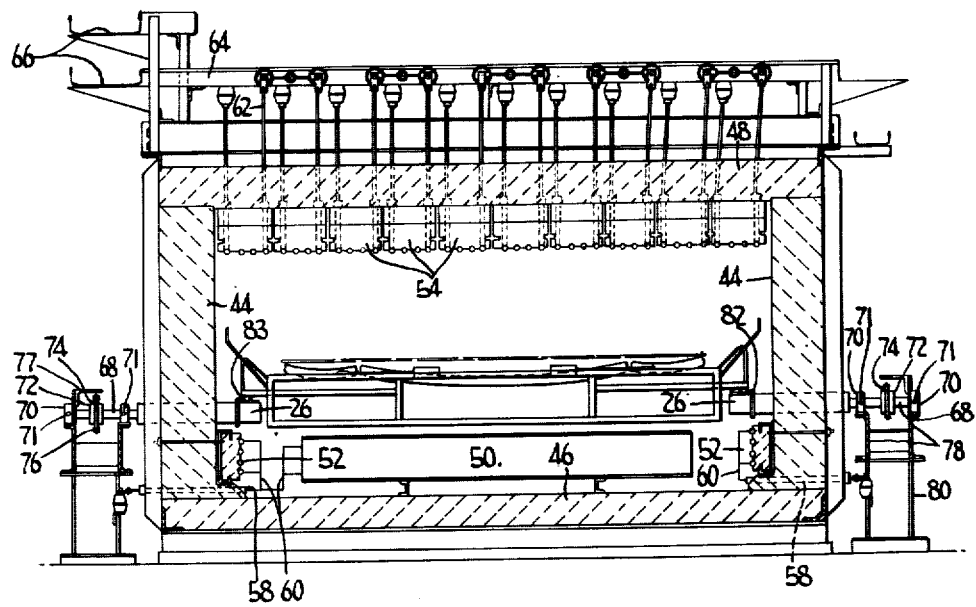
Figure 2 is a sectional view taken along the lines II—II of Figure 1.
Figure 3:
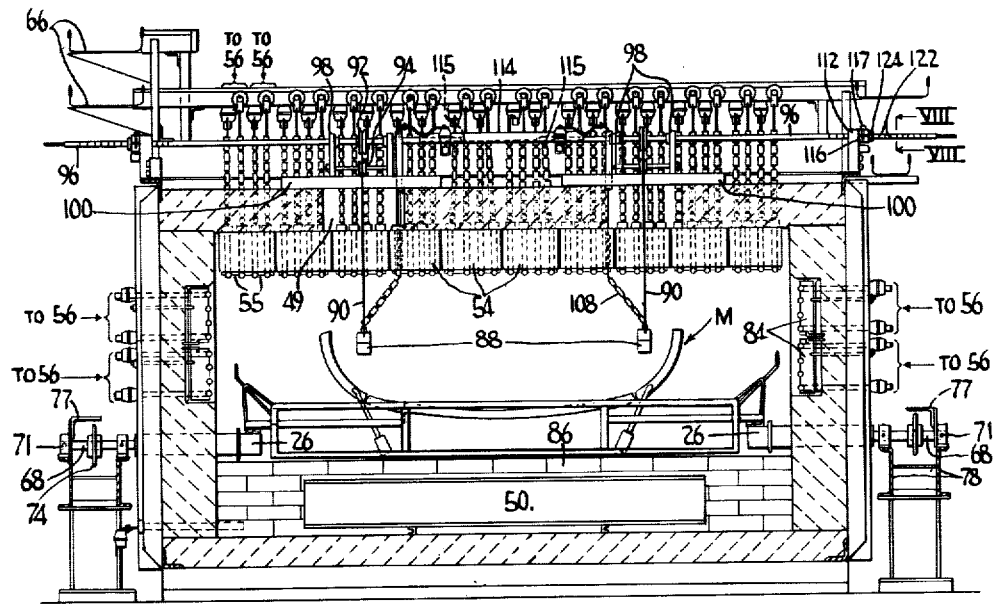
Figure 3 is a sectional view taken along the line III—III of Figure 1.
Figure 7:
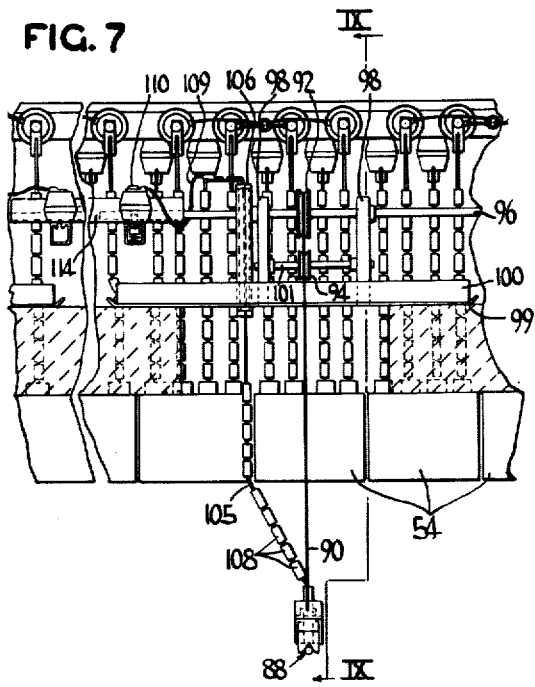
Figure 7 is a fragmentary sectional view taken along the lines VII—VII of Figure 6.
Figure 8:
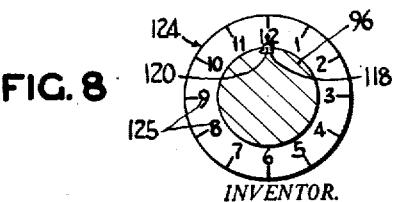
Figure 8 is a sectional view taken along the lines VIII—VIII of Figure 3.

As shown in detail in Figure 2, the preheating section comprises spaced vertical lehr walls 44 mounted on a floor 46 and interconnected at their tops by a roof 48 to provide a tunnel like enclosure of ceramic material. In the preheat section, the glass is heated uniformly throughout its extent by means of bottom electrical heating elements 50 whose longest dimension extends transversely of the lehr, and side electrical heating elements 52 and top electrical heating elements 54 whose longest dimension extends longitudinally of the lehr. The heating elements are arranged in sets aligned tranversely of the lehr. The sets are spaced longitudinally from each other a distance on the order of 5 inches. In this section, bottom heaters 50 and side heaters 52 irradiate the bottom glass surface while top heaters 54 irradiate the top glass surface.

Figure 11:
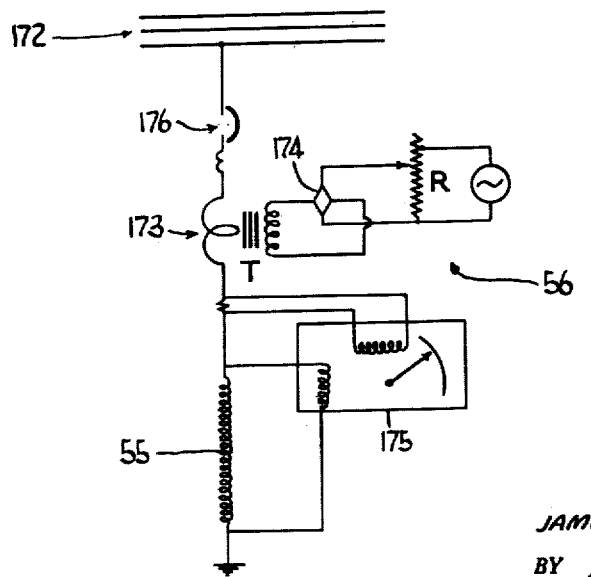
Figure 11 is a representative electrical control circuit for each individually controlled electrical heater in the exemplary bending lehr.
Figure 10:
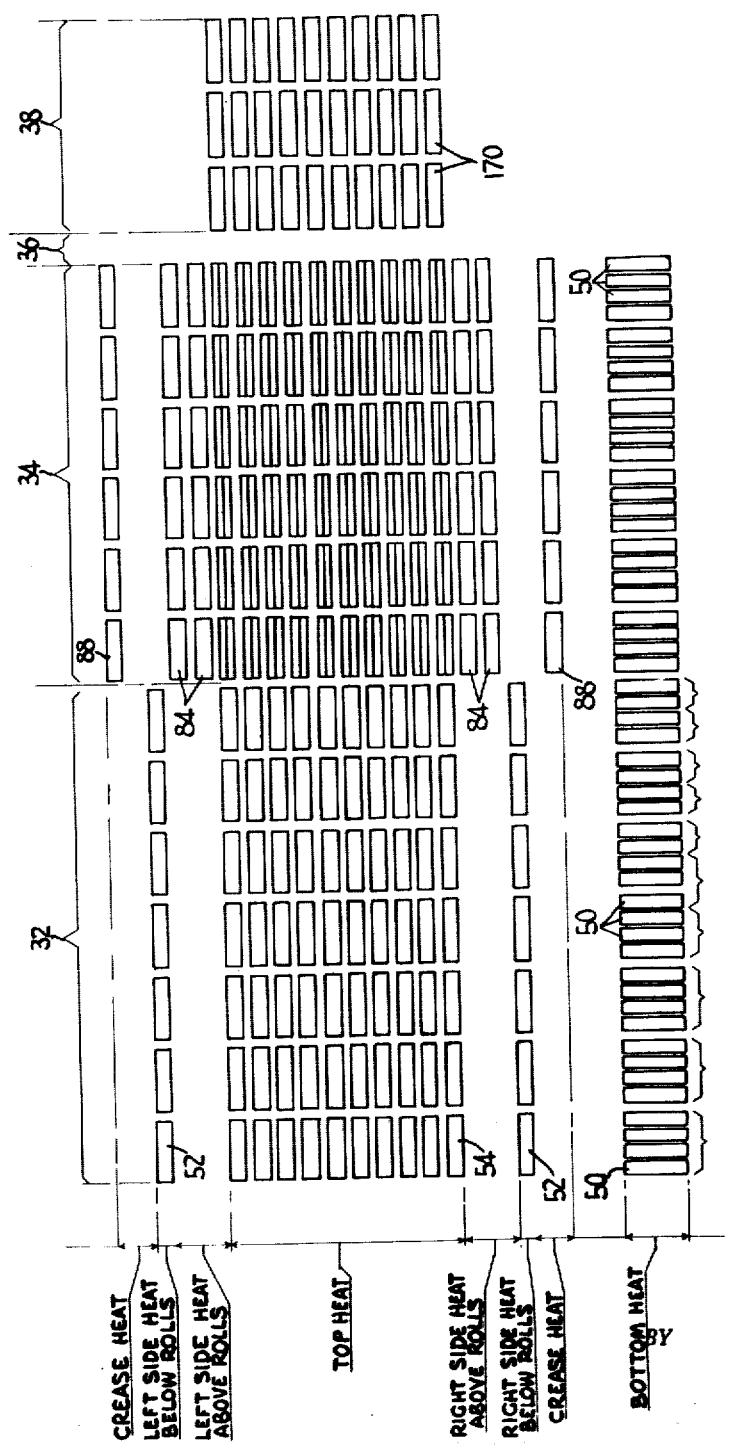
Figure 10 is a schematic block diagram showing the layout of the various electrical heaters throughout a bending lehr exemplifying the present invention.

Each heating element comprises a resistor 55 connected to a source of electrical energy through a separate voltage regulator circuit 56 (Figure 11) in a manner shown in Figures 10 and 11. The bracketed bottom heating elements of Figure 10 are connected in parallel sets of two, three or four to a single voltage regulator circuit.

Suitable ceramic sleeves 58 are provided to insure that the circuit conduits 60 for the bottom and side elements are properly insulated electrically from any metal reinforcing structure used in the lehr. Each top heating element 54 receives electrical energy through conduits 60 and 62 encased in suitable insulation. The conduits are carried above the roof 48 of the lehr on transversely extending troughs 64 and longitudinally extending troughs 66 to individual voltage regulator circuits 56.

The stub rolls 26 are mounted on shafts 68. Each latter passes through a pair of pillow blocks 70. The pillow blocks contain bearings and set screws 71 which permit sliding of the stub roll shaft laterally of the conveyor axis in order to adjust the location of the stub rolls to compensate for expansion and contraction of the mold carriages as the latter are conveyed through the bending lehr. The stub roll shafts 68 are fixed to drums 72 which rotate with sprockets 74 driven by a conveyor chain 76. The pillow blocks 70 are supported on base channels 78 to which they are attached. The base channels form the upper supporting structure for columns 80.

Lateral adjustment of the stub rolls 26 is desirable because of the provision of guiding flanges 82 adjacent the inboard extremities of the stub rolls. Unless the guide flanges are located sufficiently outboard laterally of the conveyor, the rails 83 which carry the bending carriages through the lehr will jam on the flanges because of the thermal expansion of the carriages.

*Bending section*

The structural details of the bending section of the lehr will be understood better by referring to Figures 3 and 6 to 9. In this section, the top heating elements 54 and the bottom electrical heating elements 50 are located in positions similar to those for the preheating section. The longitudinal extremities of the top heating elements are separated from their neighboring top heating elements. The roof 48 is provided with narrow laterally extending slots 49 immediately above a portion of the space intermediate longitudinally adjacent sets of overhead heaters.

In this section, the bending section side heating elements 84 are located above the support level of the conveyor, whereas in the preheat section, the side elements are located below this support level. This higher location of the side heating elements in the bending section assures heat delivery to the glass extremities that are raised upwardly during the bending action.

The bending section is also provided with transverse baffle walls 86 interposed between the bottom heating assemblies 50 and the molds. These baffle walls provide a muffle heat arrangement.

An important feature of this invention is the provision of crease heaters 88. In the embodiment shown in Figures 3 and 6 to 9, crease heaters 88 are supported at each end by cables 90 and 91 extending through slots 49 in the roof. The cables are entrained about pulley 92 in pairs. Cable 90 depends directly from pulley 92 to support one end of a crease heater 88. Cable 91 is entrained about an idler wheel 94 to support an adjacent end of the adjacent crease heater. Each pulley 92 is mounted on an axle rod 96 which forms a bearing rod for rotating pulleys 92. The bending section comprises a number of pulleys 92, one for each crease heater extremity. No idler wheels 94 are required for the front of the first crease heater or the rear of the last crease heater. Rotating the axle rod 96 raises or lowers the support wires 90 and 91 thereby adjusting the vertical position of the crease heaters 88 within the lehr.

The axle rods 96 are secured to bearing brackets 98. The latter in turn are spaced transversely of the lehr to form uprights for a support structure which includes an apertured sliding plate 99 to which is attached a refractory block 100 having aligned apertures. Bearing brackets 98 are interconnected by a bearing rod 101 upon which idler wheel 94 rotates. The plates 99 are wider and longer than the slots 49 cut out of the bending section roof, thus insuring that the lehr heat is not lost through the roof. The lehr roof 48 is reinforced with angle irons 103 to facilitate sliding of plate 99 thereon. The apertures of the plate receive the cables 90 and 91 as well as conduits 105, which supply electrical power to the crease heaters. Moving axle rods 96 transversely of the lehr disposes the plates 99, pulleys 92, idler wheels 94 and crease heaters 88 into their desired transverse positions relative to the lehr within the limits permitted by the slots 49.

Conduits 105 are threaded through elongated ceramic sleeves 106 and spools 108. The conduits 105 are provided with a slackened extension 109 between the ceramic sleeve 106 and an electrical connector 110 in order to insure that the crease heaters are maintained connected to a source of electrical energy regardless of movement of the plate 99.

The axle rods 96 are each supported on an end support 112 and a center channel support 114 forming part of the structural framework for the lehr. The latter comprises laterally spaced and opposed channels 115. Movement of each axle rod 96 through supports 112 and 114 insures that the crease heaters are moved with the support housing provided by the base plate 99 perpendicularly to the direction of glass movement through the lehr. The opposing channels of the center channel support 114 terminate outwardly of the longitudinal center line of the lehr.

A split collar 116 is mounted on each end support to provide a bearing for each axle rod 96. A screw 117 is used to tighten the split collar about its axle rod to lock the axle rod in place, thus assuring that the crease heaters remain in a fixed position until a change of location is desired. Flanged grooves 118 extend longitudinally of each axle rod 96 and receive the shoes of a slidable pointer 120. Circular index lines 122 are marked on the axle rod and numbered to indicate the lateral position of the crease heater extremities carried by the axle rod and the support structure. The grooves 118 are substantially coextensive with the index lines 122. When the collar 116 is tightened, it is fixed securely to the axle rod 96 and limits the inward movement of the latter to a position determined by abutment of collar 116 against end support 112.

A washer dial 124 is mounted in fixed orientation to the outboard surface of the collar 116. The dial face is provided with indicia 125. Pointers 120 indicate the vertical position of the crease heater extremities by the orientation relative to the dial face.

In order to position the crease heaters for a particular bend, the split collars 116 are loosened to enable rotation of the axle rods 96. When the rods have been rotated sufficiently as indicated by the setting of the pointer 120 on washer dial 124, the rods 96 are displaced laterally until the proper index line or space therebetween registers with the washer dial. Screws 117 are then tightened to secure the split collars 116 about their respective axle rods 96. Thus, the crease heaters are located in a horizontal and vertical position that can be recorded for subsequent duplication when fabrication of the particular part is repeated.

Neutralizing section

A cross sectional view of the neutralizing or normalizing section 36 is shown in Figure 4. No heat is imparted to this portion of the furnace. The walls 44 are of insulated refractory material and the furnace roof 48 includes an 8 inch stainless steel plate supported by thrust pins 142 whose upper ends are carried by girders 144. The stainless steel plate 140 supports a laminate of refractory material which may include a 3 inch layer of refractory 146 underlying a 2 inch layer of refractory 148. A 2 inch blanket 150 of rock wool lies atop the 2 inch refractory and is spaced from the bottom of the girder 144.

Keystone shaped apertures 152 are cut in the refractory roofing material 146, 158 and 150. The keystone shaped closure members 153 formed from the cut away portions of the insulating roofing materials are carried by a support pin 154 comprising a bottom support flange 156. The upper end of the pin is pivoted at one end of a lever arm 158 which is pivoted about a bracket 160 mounted on the girder 144. A chain 162 is utilized for rotating the lever arm 158 and lifting or lowering the keystone shaped refractory material relative to the roof. The latter may be attached to a hand wheel and brake (not shown).

The amount that each keystone shaped refractory closure member 153 is raised from its associated keystone shaped recess 152 determines the rate of cooling imparted to the glass sheets conveyed through this section. The apertures are above the severely bent portions of the glass conveyed through this lehr section to enhance cooling of the glass in these portions.

The purpose of the normalizing section is to permit the glass sheets after they have been subjected to glass bending temperatures, to cool to the top of the annealing range as rapidly as possible. By providing adjustable ceiling apertures, the total length of the bending lehr, including its annealing section, can be reduced considerably. Alternatively, for a given length of bending and annealing lehr, the productive capacity can be increased by virtue of the inclusion of this section wherein the glass is cooled rapidly from glass softening temperatures to the top of its annealing range. For plate glass this range of cooling is from about 1250° F. (softening point) to about 1050° F. (top of the annealing range).

Annealing and cooling zones

The next lehr section 38 is termed the annealing and reheating section. This section is similar in structure to the preheating section except that the bottom heaters 50 and side heaters 52 are omitted. Electrical heating elements 170 are supported in the roof of this section. These heating elements are separately connected to individual control circuits 56 and are arranged in a plurality of rows. The provision of separate control elements for each of the heaters 170 overcomes any tendency toward non-uniform temperature across the glass sheet by having each individual overhead heater supply an amount of heat needed to moderate the cooling rate of the incremental portion of the glass sheets that pass thereunder. The glass sheets are then conveyed through the second annealing section 40 wherein the glass is cooled through its annealing range while maintaining a minimum temperature differential throughout the sheet. The cooling tunnel 42 located immediately beyond the second annealing section 40 facilitates the rapid cooling of the glass sheets below the annealing range to a temperature at which they can be handled and unloaded from the molds at the discharge and unloading station 28.

Electrical control circuits

Electrical control circuits are provided for each bank of resistances depicted by a block in Figure 10, with the exception of the bottom heaters 50 that are bracketed. The bracketed bottom heaters are controlled by means of an individual voltage control such as a variable transformer (not shown). Similarly, each bank of resistances depicted by a block in Figure 10 is controlled by an individual voltage control unit. Thus, the heating pattern traversed by the glass sheets moving laterally through the bending lehr may be modified to provide the desired overall heating or moderated cooling effect along the path of glass movement as well as the desired variations in the heating pattern transversely of the path of movement.

A typical control circuit for any individual resistor 55 forming the basic component of any of the heating elements 50, 52, 54, 84, 88 or 170 is shown schematically in Figure 11. Each resistor 55 (or parallel bank of resistors in the case of certain bottom heating elements in the preheat section) is grounded at one end and coupled to one of the phases of a three phase power line 172 through a saturable reactor circuit 173, including a transformer T, a selenium rectifier 174 and a variable resistor R. A wattmeter 175 indicates the power delivered to the resistor. When the wattmeter shows that the power delivered to the resistor 55 is not correct, the setting of resistance R of the saturable reactor circuit is changed, thereby affecting the reactance provided by the saturable reactor and changing the heating effect of resistor 55. A circuit breaker 176 is included in the circuit for safety purposes.

Mold return conveyor

Figure 5:
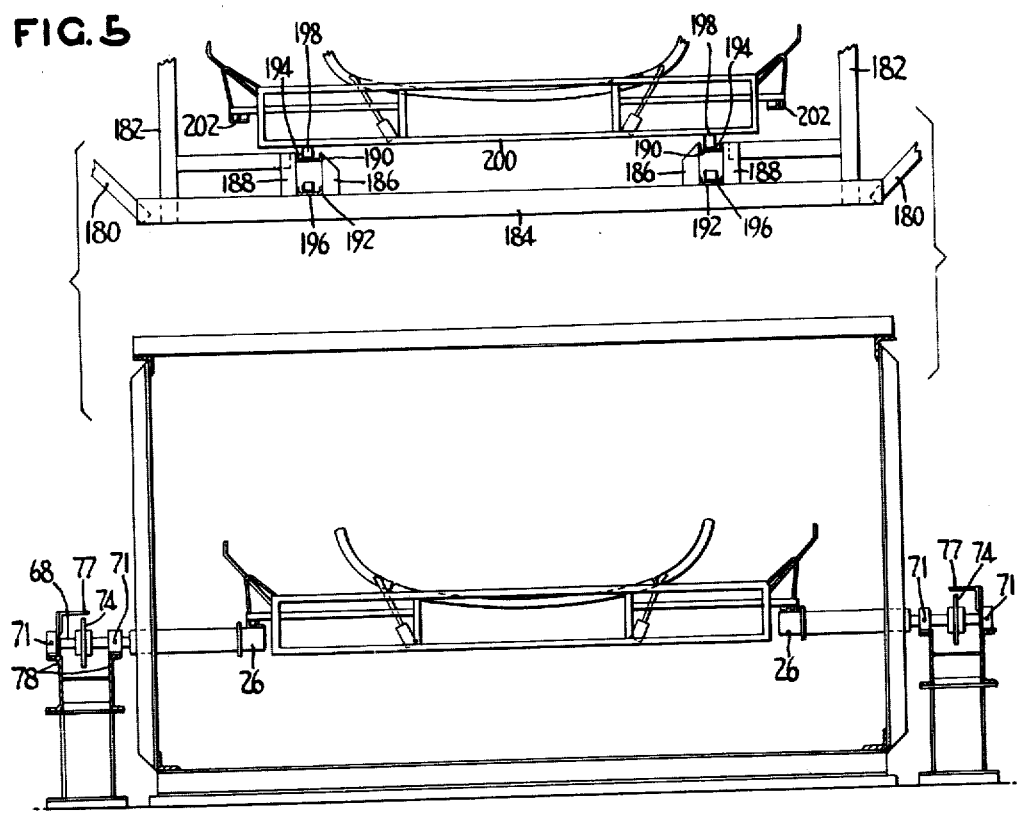
Figure 5 is a cross sectional view of the lehr taken along the lines V—V of Figure 1.
Figure 6:
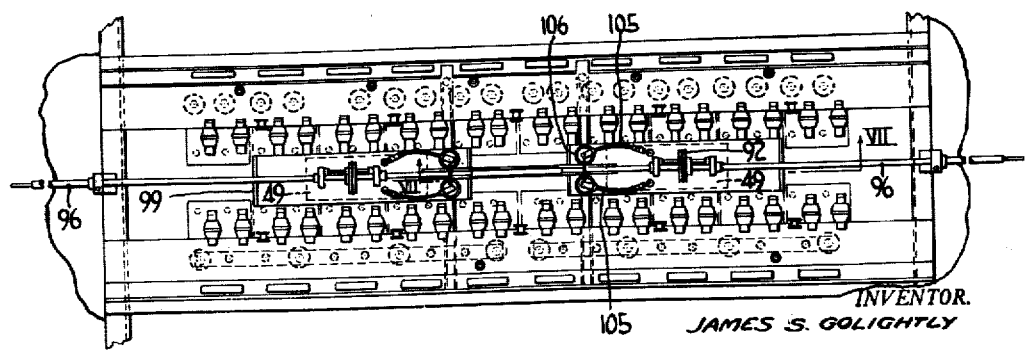
Figure 6 is an enlarged, detailed plan view of details forming part of the present invention.
Figure 9:
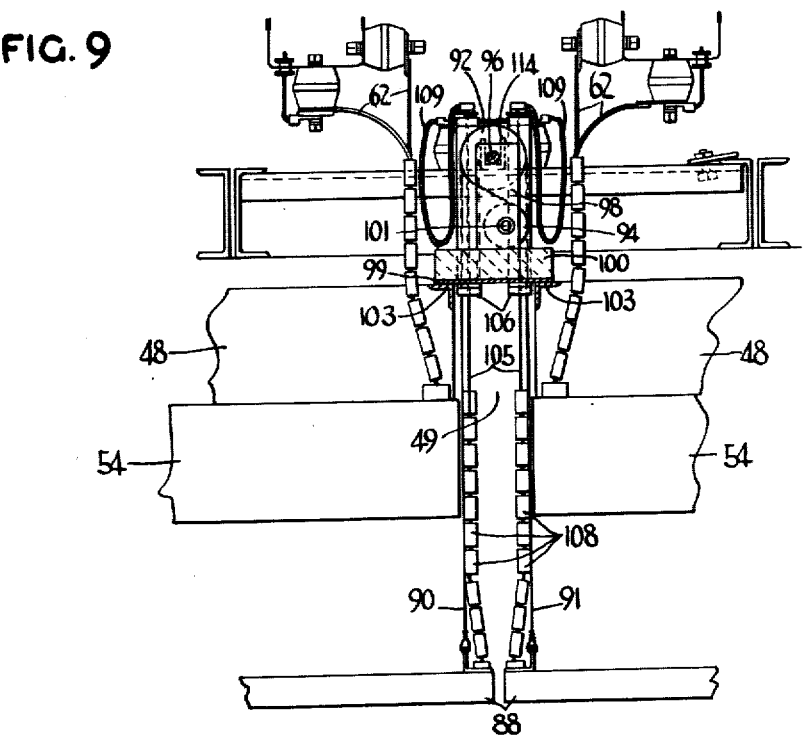
Figure 9 is a detailed sectional view along the lines IX—IX of Figure 7.

The mold return conveyor is best shown in the cross sectional view incorporated in Figure 5. A pair of support braces 180 and columns 182 help carry transverse beams 184 which support inner and outer vertical guide members 186 and 188 above the lehr. The latter carry upper and lower tracks 190 and 192, respectively. The upper tracks 190 support the upper run 194 of spaced chains and the lower tracks 192 support the lower runs 196 of the spaced chains.

Lugs 198 move with the conveyor chains and when they are in the upper run, engage carriage beams 200 to push the carriages toward the loading station at the opposite end of the bending lehr from the discharge station. The particular configuration of the mold carriage wherein the carriage beams 200 are below and terminate inboard of the carriage rails 202, which ride on the conveyor stub rolls when the mold support carriages pass through the bending lehr during the bending operation, saves the rails from unnecessary wear during the return run. Thus, the life of the rails 202 is doubled since they are not subjected to banging and other undesirable treatment during the return run.

The above description of a desirable lehr made in accordance with the present invention has been for the purpose of illustration rather than limitation. The scope of the present invention is limited only by the accompanying claims. Furthermore, the right to present claims to other inventions disclosed herein in other copending applications is not precluded by presenting claims limited as follows:

What is claimed is:

1. In apparatus for bending glass sheets into non-uniform curvatures comprising a horizontally disposed, tunnel type conveyor for moving glass sheets therethrough on bending molds, and a bending section containing longitudinally spaced sets of overhead heaters above and across the conveyor path, the improvement comprising a transversely slotted roof portion for said bending section in the space intermediate adjacent sets, a support housing slidable transversely of the conveyor above each slot of the slotted roof portion, an apertured base plate having dimensions exceeding those of the slot of the slotted roof portion forming the bottom of said slidable support housing, suspension means extending vertically through an aperture in said apertured base plate, an auxiliary heater carried by said suspension means, means carried by said slidable support housing to move said suspension means vertically relative to said apertured base plate, thereby changing the vertical position of said auxiliary heater without requiring horizontal movement and means guiding the movement of said support housing along an axis parallel to said slot.

2. The improvement according to claim 1, including means for indicating the horizontal position of each auxiliary heater and means for indicating the vertical position of each auxiliary heater.

3. In apparatus for bending glass sheets into complex curvatures including spaced sharply curved regions, said apparatus comprising a horizontally disposed, tunnel type conveyor for moving glass sheets therethrough on bending molds, and a bending section containing longitudinally spaced sets of overhead heaters above and across the conveyor path, the improvement comprising a transversely slotted roof portion for said bending section in the space intermediate adjacent sets, said slotted roof portion including a transversely extending slot on either side of the longitudinal center line of the conveyor overlying the path of movement of the spaced regions to be curved sharply, a support housing slidable transversely of the conveyor above each slot of the slotted roof portion, an apertured base plate having dimensions exceeding those of the slot of the slotted roof portion forming the bottom of said slidable support housing, suspension means extending vertically through an aperture in said apertured base plate, an auxiliary heater carried by said suspension means, means carried by said slidable support housing to move said suspension means vertically relative to said apertured base plate, thereby changing the vertical position of said auxiliary heater without requiring horizontal movement and means guiding the movement of said support housing along an axis parallel to said slot.

4. The improvement according to claim 3, including means for indicating the horizontal position of each auxiliary heater and means for indicating the vertical position of each auxiliary heater.

5. In apparatus for bending glass sheets into non-uniform curvatures comprising a horizontally disposed, tunnel type conveyor for moving glass sheets therethrough on bending molds, and a bending section containing longitudinally spaced sets of overhead heaters above and across the conveyor path, the improvement comprising a transversely slotted roof portion for said bending section in the space intermediate adjacent sets, a support housing slidable transversely of the conveyor above each slot of the slotted roof portion, an apertured base plate having dimensions exceeding those of the slot of the slotted roof portion forming the bottom of said slidable support housing, pulley means carried by said support housing, a cable entrained over said pulley means and depending vertically through an aperture in said base plate, an auxiliary heater carried by said cable, a rotatable rod fixed to said pulley and extending laterally of the conveyor above the latter from beyond the conveyor to beyond the pulley and a transversely extending groove engaged by the rod to limit the support housing to movement along an axis transverse of the conveyor.

6. The improvement according to claim 5, wherein the rod comprises spaced markings extending circumferentially of the outer surface of the rod to denote the horizontal position of the auxiliary heater.

7. The improvement according to claim 6, wherein the rod includes a pointer fixed for rotation therewith and the bending section structure includes a bearing bracket having a dial face fixed to its laterally outboard surface, the orientation of the pointer relative to the dial face indicating the vertical position of the auxiliary heater.

8. In apparatus for bending glass sheets into complex curvatures including spaced sharply curved regions, said apparatus comprising a horizontally disposed, tunnel type conveyor for moving glass sheets therethrough on bending molds, and a bending section containing longitudinally spaced sets of overhead heaters above and across the conveyor path, the improvement comprising a transversely slotted roof portion for said bending section in the space intermediate adjacent sets, said slotted roof portion including a transversely extending slot on either side of the longitudinal center line of the conveyor overlying the path of movement of the spaced regions to be curved sharply, a support housing slidable transversely of the conveyor above each slot of the slotted roof portion, an apertured base plate having dimensions exceeding those of the slot of the slotted roof portion forming the bottom of said slidable support housing, pulley means carried by said support housing, a cable entrained over said pulley means and depending vertically through an aperture in said base plate, an auxiliary heater carried by said cable, a rotatable rod fixed to said pulley and extending laterally of the conveyor above the latter from beyond the conveyor to beyond the pulley and a transversely extending groove engaged by the rod to limit the support housing to movement along an axis transverse of the conveyor.

9. The improvement according to claim 8, wherein the rod comprises spaced markings extending circumferentially of the outer surface of the rod to denote the horizontal position of the auxiliary heater.

10. The improvement according to claim 9, wherein the rod includes a pointer fixed for rotation therewith and the beinding section structure includes a bearing bracket having a dial face fixed to its laterally outboard surface, the orientation of the pointer relative to the dial face indicating the vertical position of the auxiliary heater.

References Cited in the file of this patent

UNITED STATES PATENTS

| | | |
|---|---|---|
| 1,478,375 | Bennett | Dec. 25, 1923 |
| 1,678,234 | Soubier | July 24, 1928 |
| 1,705,697 | Woodson | Mar. 19, 1929 |
| 1,771,876 | Cramer | July 29, 1930 |
| 1,807,147 | Brooke | May 26, 1931 |
| 1,868,856 | Sylvester | July 26, 1932 |
| 1,957,132 | Callard | May 1, 1934 |
| 2,215,079 | Hess | Sept. 17, 1940 |
| 2,370,381 | Vaughan | Feb. 27, 1945 |
| 2,618,906 | Hess | Nov. 25, 1952 |
| 2,756,319 | Hatch | July 24, 1956 |

UNITED STATES PATENT OFFICE

CERTIFICATE OF CORRECTION

Patent No. 2,794,300 June 4, 1957

James S. Golightly

It is hereby certified that error appears in the printed specification of the above numbered patent requiring correction and that the said Letters Patent should read as corrected below.

Column 5, line 15, for "158" read -- 148 --; line 25, after "brake" insert -- unit --.

Signed and sealed this 14th day of January 1958.

(SEAL)
Attest:

KARL H. AXLINE
Attesting Officer

ROBERT C. WATSON
Commissioner of Patents